Nov. 11, 1969          C. B. HOOD, JR., ET AL          3,477,434
                         CRYOSURGICAL APPARATUS

Filed June 2, 1965                                7 Sheets-Sheet 1

INVENTORS
CHARLES B. HOOD JR.
BY IRA W. SIMONS

Schmieding and Fultz
ATTORNEYS

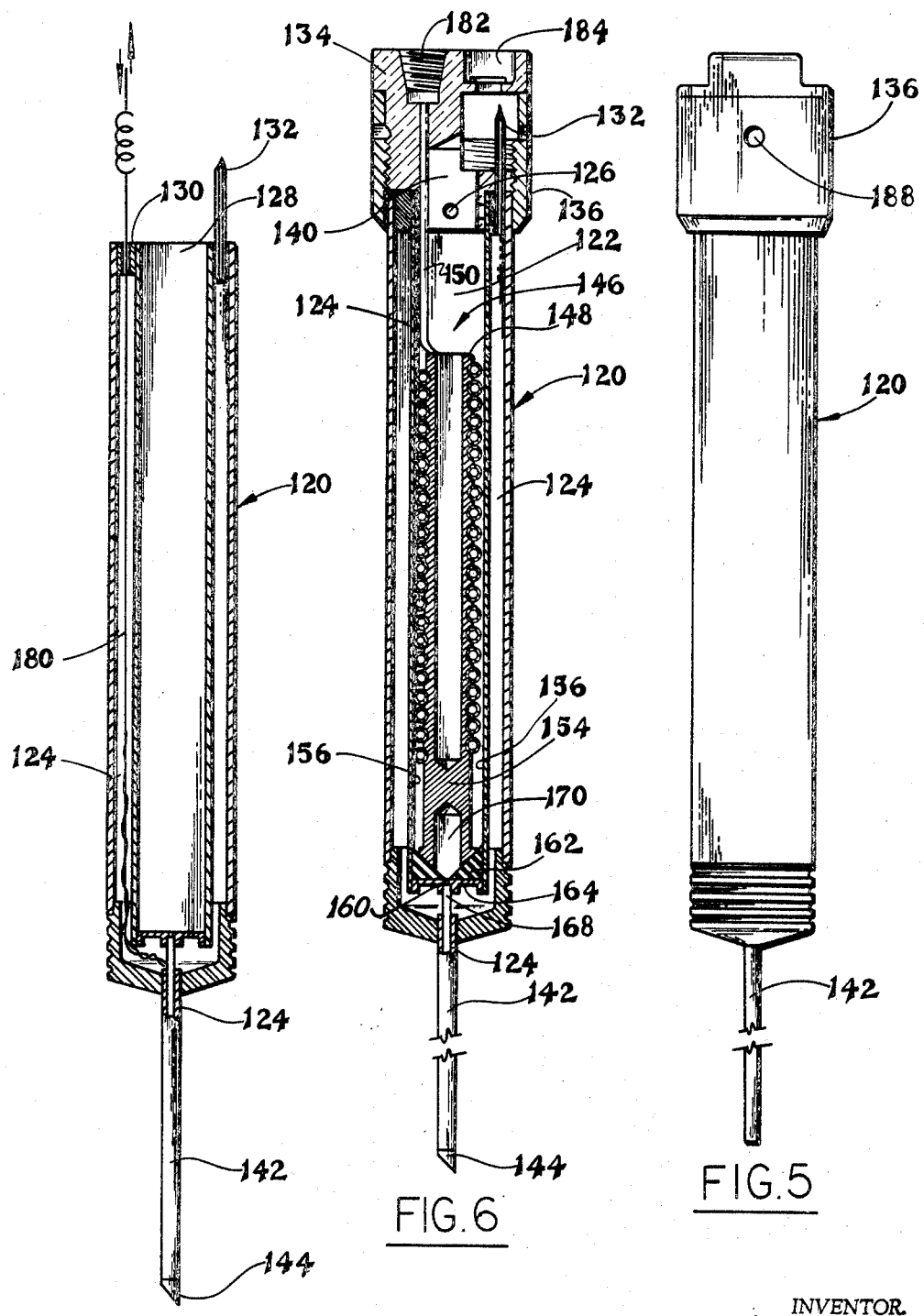

Nov. 11, 1969  C. B. HOOD, JR., ET AL  3,477,434
CRYOSURGICAL APPARATUS
Filed June 2, 1965  7 Sheets-Sheet 4
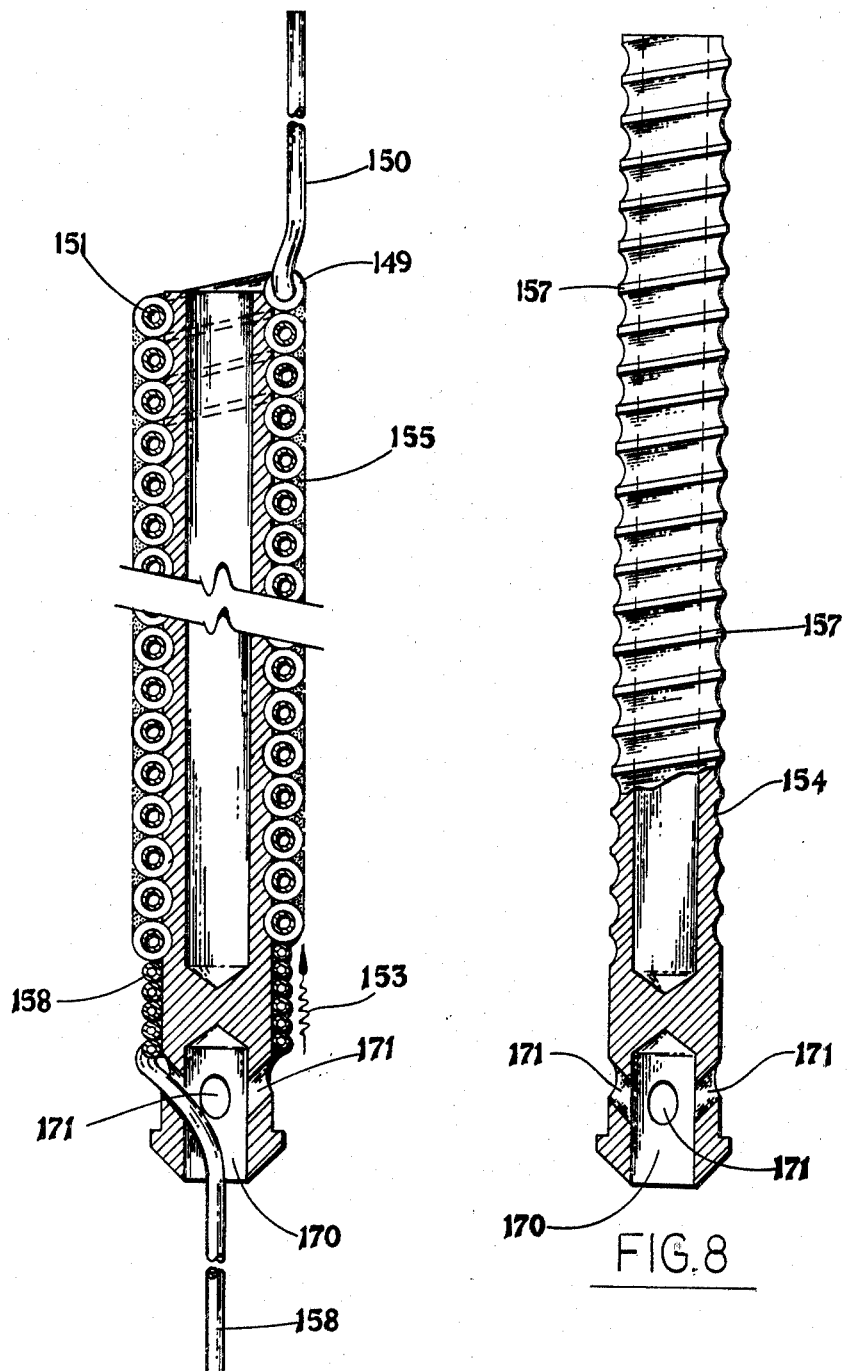
INVENTOR.
CHARLES B. HOOD JR.
IRA W. SIMONS
BY
Schmieding & Fultz
ATTORNEYS

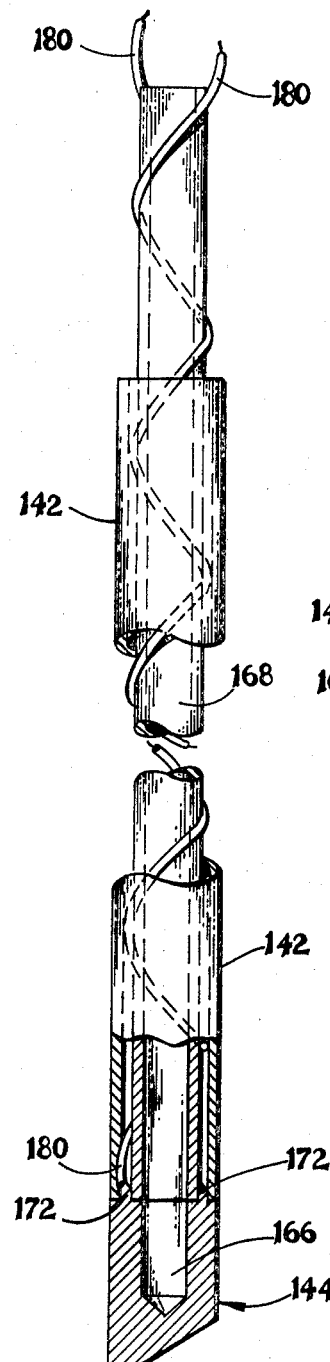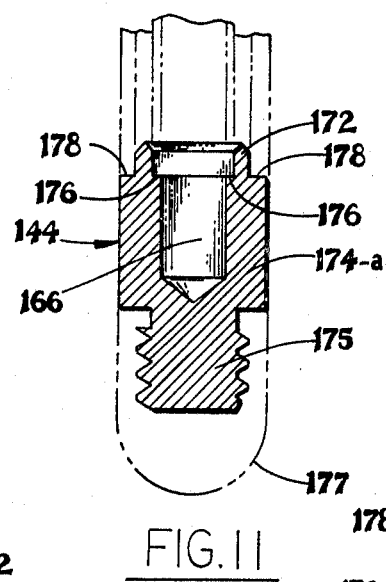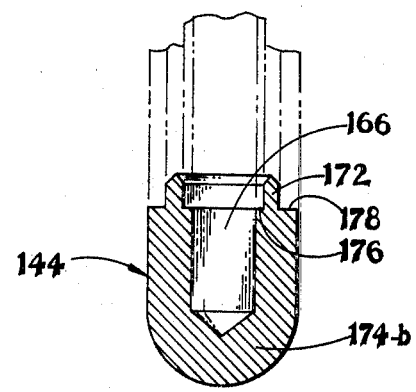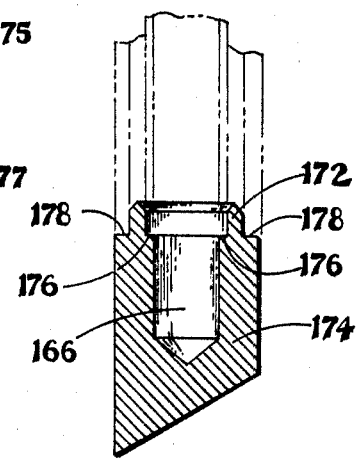

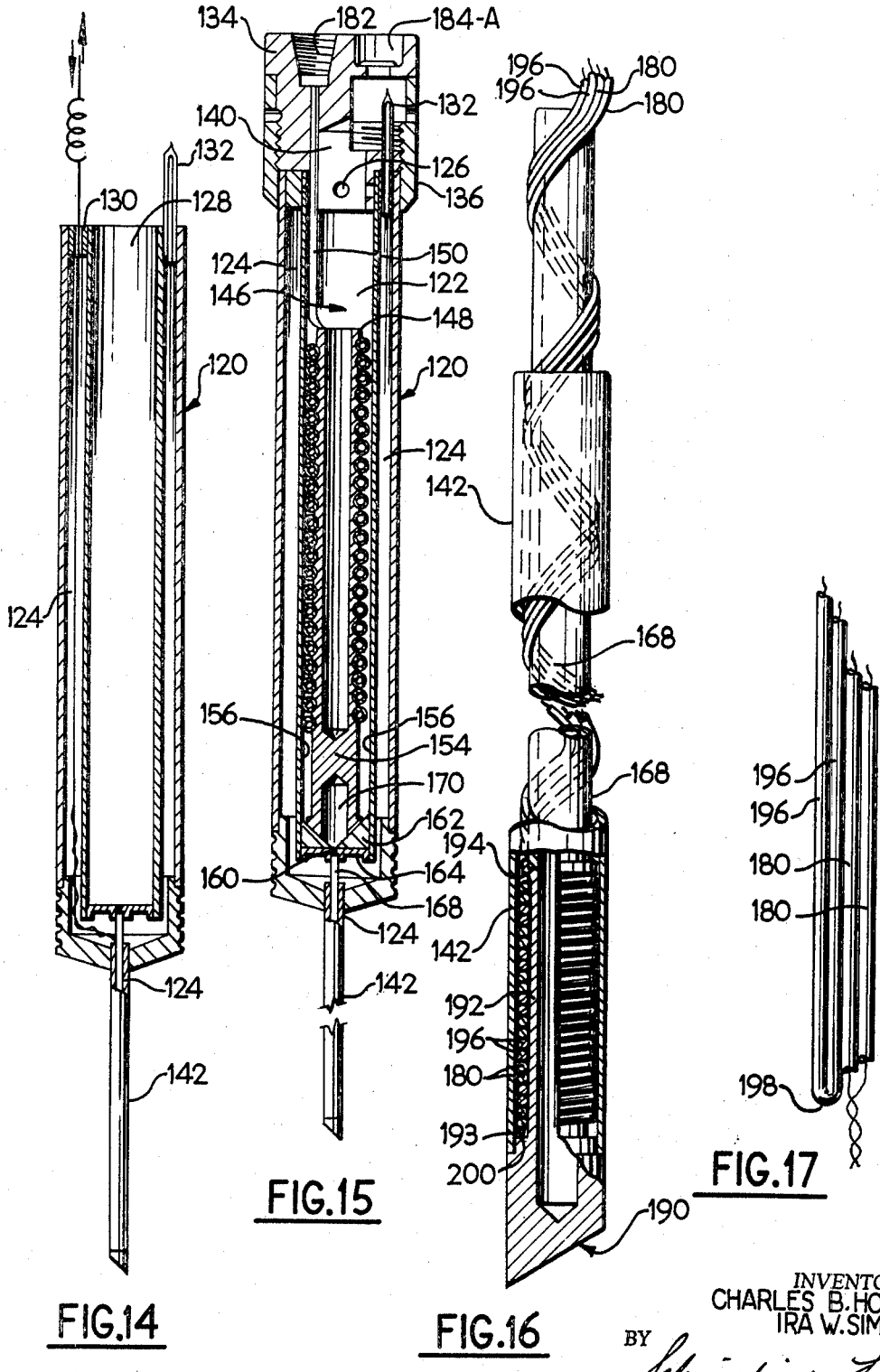

United States Patent Office 3,477,434
Patented Nov. 11, 1969

3,477,434
CRYOSURGICAL APPARATUS
Charles B. Hood, Jr., and Ira W. Simons, Columbus, Ohio, assignors to CVI Corporation, a corporation of Ohio
Continuation-in-part of application Ser. No. 441,687, Mar. 22, 1965. This application June 2, 1965, Ser. No. 460,751
Int. Cl. A61b *17/36;* A61f *7/12*
U.S. Cl. 128—303.1                    18 Claims

ABSTRACT OF THE DISCLOSURE

A cryosurgical apparatus characterized by a housing means adapted for manual manipulation by a surgeon, and a probe portion provided with a cold tip. The apparatus further includes a miniature cryogenic heat exchanger including a warmer path extending axially within said handle portion for conducting a flow of refrigerant to said cold tip and a colder path for conducting a counter flow of said refrigerant in heat exchange relationship with said first path. The apparatus is further characterized by flow control valve means for the refrigerant for controlling the temperature of the cold tip, and heating means at the cold tip for rapidly raising the temperature thereof.

---

The present invention relates generally to cryosurgical devices and particularly to an improved cryosurgical apparatus for use in surgery of the type wherein tissue is frozen instead of removed by conventional surgical techniques.

This application is a continuation-in-part of my co-pending application Serial No. 441,687 filed Mar. 22, 1965 which is a continuation-in-part of my co-pending application Ser. No. 419,504 filed Dec. 18, 1964 now abandoned.

In general, the cryosurgical apparatus of the present invention comprises a refrigerated probe adapted for the precise localized freezing of body tissue that is mounted on a housing means adapted to function as an insulated handle for manual manipulation by a surgeon. The housing means also serves as a sealed insulated container for a miniature cryogenic refrigeration apparatus that receives a flow of cryogenic gas refrigerant from a remote storage vessel. The refrigeration components include a heat exchanger, a capillary expansion portion and a cold chamber all of which are compactly mounted within the housing means and serve to deliver a flow of refrigerant and concentrate the refrigeration effect thereof on the extreme tip of the probe.

The cryosurgical apparatus further includes manually actuated valve means whereby the surgeon can rapidly cool and allow to warm the probe tip as may be required to freeze and thaw localized areas of body tissue.

As an aspect of the present invention, the novel construction of the cryosurgical apparatus includes a miniature yet highly efficient heat exchanger and associated refrigeration apparatus disposed within the handle means that makes possible the use of a cryogenic refrigerant in the gaseous state which may be stored inexpensively in a conventional pressure cylinder at room temperature.

As another aspect of the present invention, the novel use of a heat exchanger and capillary expansion portion produce the required low temperature within the necessary tolerances required for this delicate type of surgery.

As another aspect of the present invention, the miniature cryogenic refrigeration apparatus is removably mounted in the housing means to permit relatively simple removal for maintenance and repair.

As another aspect of the present invention, the novel construction of the cryosurgical apparatus permits the surgeon to very rapidly control the temperature of the cold tip portion with relative ease and facility.

As another aspect of the present invention, the novel construction permits a variety of cold tip extensions to be removably mounted whereby the operator may choose between different sizes and shapes to best meet a particular application.

As another aspect of the present invention, the novel construction of the cryosurgical apparatus permits the surgeon to rapidly and directly warm the tip to provide a quick thaw of the cold tip from the tissue thereby reducing the time necessary for completion of the operation.

As a further aspect of the present invention, the novel combination of a heat exchanger in the handle means, a capillary expansion portion and the associate conduit means permits inexpensive manufacture and fabrication of the cryosurgical apparatus using standard procedures and techniques.

It is, therefore, an object of the present invention to provide a novel cryosurgical apparatus which permits the use of a gaseous refrigerant instead of a liquified cryogenic gas refrigerant, the latter requiring relatively complex and expensive insulated and refrigerated storage vessels.

It is another object of the present invention to provide a novel cryosurgical apparatus which incorporates a miniature heat exchanger mounted within an insulated housing means that also functions as a handle portion, said apparatus being highly efficient in producing cryogenic temperatures within the high degree of accuracy required by this type of surgical technique.

It is another object of the present invention to provide a cryosurgical apparatus which permits relatively simple maintenance and repair by removably mounting the cryogenic refrigeration apparatus in the housing means for easy access thereto.

It is another object of the present invention to provide a cryosurgical apparatus which permits the precise control of the operating temperature of the cold tip portion by the surgeon with ease and facility.

It is another object of the present invention to provide a cryosurgical apparatus which permits the changing of the size and shape of the cold tip portion in a relatively easy and economical manner to better meet different surgical applications.

It is another object of the present invention to provide a cryosurgical apparatus which permits the surgeon to rapidly warm the cold tip portion by the use of an electrical heating element mounted within the housing which may be conveniently controlled by the surgeon or an assistant.

It is a further object of the present invention to provide a cryosurgical apparatus of simple construction which may be manufactured and fabricated at minimum cost and yet which provides the high degree of facility and accuracy in operation which is required in this delicate type of surgery.

Further objects and advantages of the present invention will be apparent from the following description, reference being had to the accompanying drawings wherein preferred forms of embodiments of the invention are clearly shown.

In the drawings:

FIG. 5 is a front elevational view of another embodiment of the cryosurgical apparatus of the present invention;

FIG. 6 is a side sectional view of the embodiment shown in FIG. 5, illustrating the novel construction of a housing means with a miniature cryogenic cooling apparatus mounted therein, the section being taken along the centerline of the apparatus of FIG. 5;

FIG. 7 is a side elevational sectional view of the housing means shown in FIG. 6, the housing means being shown isolated from the remaining structure, the section being taken along the centerline of the apparatus of FIG. 5;

FIG. 8 is a front elevational view partially in section of a portion of the apparatus shown in FIG. 5, illustrating the core of the heat exchanger means;

FIG. 9 is a front elevational sectional view of a portion of the apparatus shown in FIG. 5, illustrating the construction of the heat exchanger means and expansion cooling means of the embodiment shown in FIG. 5;

FIG. 10 is a partial elevational view, partially in section, of the probe portion of the embodiment shown in FIG. 5;

FIG. 11 is an enlarged elevational view in section of a portion of one embodiment of the present invention illustrating a cold tip portion provided with means for removably mounting a surgical extension thereon, the section being taken along a vertical plane through the centerline of the apparatus;

FIG. 12 is an enlarged elevational view in section of a portion of the present invention illustrating another modification of the cold tip portion, the section being taken along a vertical plane through the centerline of the apparatus;

FIG. 13 is an enlarged elevational view in section of a portion of the present invention illustrating another modification of the cold tip portion, the section being taken along a vertical plane through the centerline of the apparatus;

FIG. 14 is a partial side sectional view of another embodiment of the cryosurgical apparatus of the present invention illustrating the housing means, the section being taken along the centerline of the apparatus;

FIG. 15 is a side sectional view of the embodiment shown in FIG. 14, illustrating a miniature cryogenic refrigeration apparatus mounted in place within the housing means, the section being taken along the centerline of the apparatus;

FIG. 16 is a partial side view partially in section of a portion of the embodiment illustrated in FIG. 15 illustrating a modified construction of the probe portion including the cold tip and associated heating means;

FIG. 17 is an enlarged partial side view of the modified embodiment of FIG. 16 illustrating the heater lead and thermocouple wires which are shown in isolated relationship from the rest of the apparatus.

Figure 1:
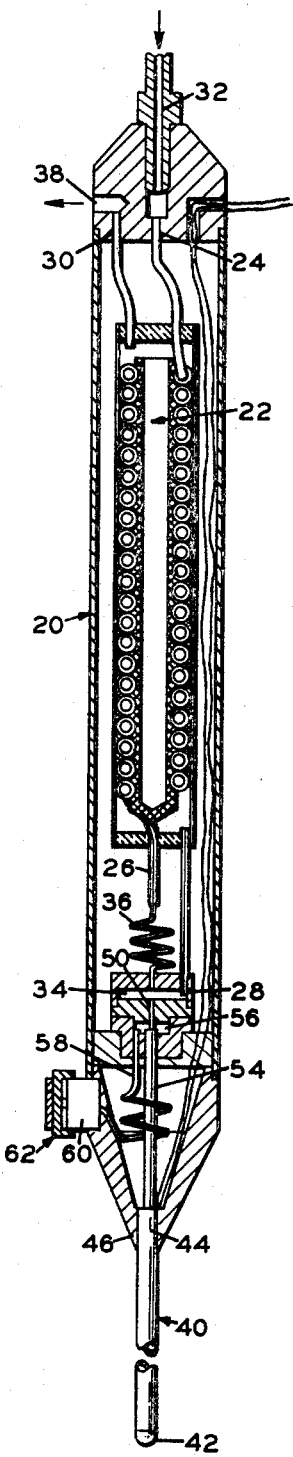
FIG. 1 is a side view partially in section of a cryosurgical apparatus constructed in accordance with the present invention.

Referring in detail to the drawings, FIG. 1 illustrates a cryosurgical apparatus constructed in accordance with the present invention. A combined housing and handle means, indicated generally at 20, forms an insulating vacuum space that surrounds a heat exchanger, indicated generally at 22, and associated miniature refrigeration apparatus later described herein.

Heat exchanger 22 comprises a warmer path 86 including an inlet 24 and an outlet 26 and a colder path 88 including an inlet 28 and an outlet 30.

Figure 4:
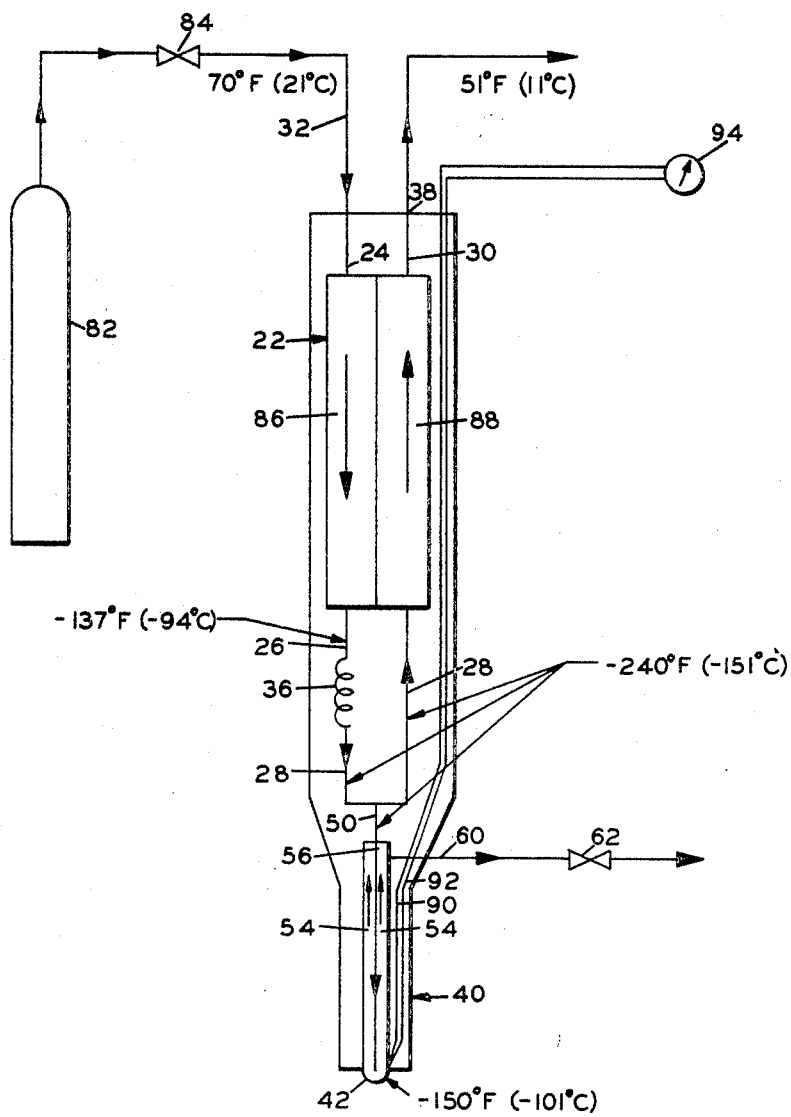
FIG. 4 is a diagrammatic view of a cryosurgical apparatus construction in accordance with the present invention.
Figure 18:
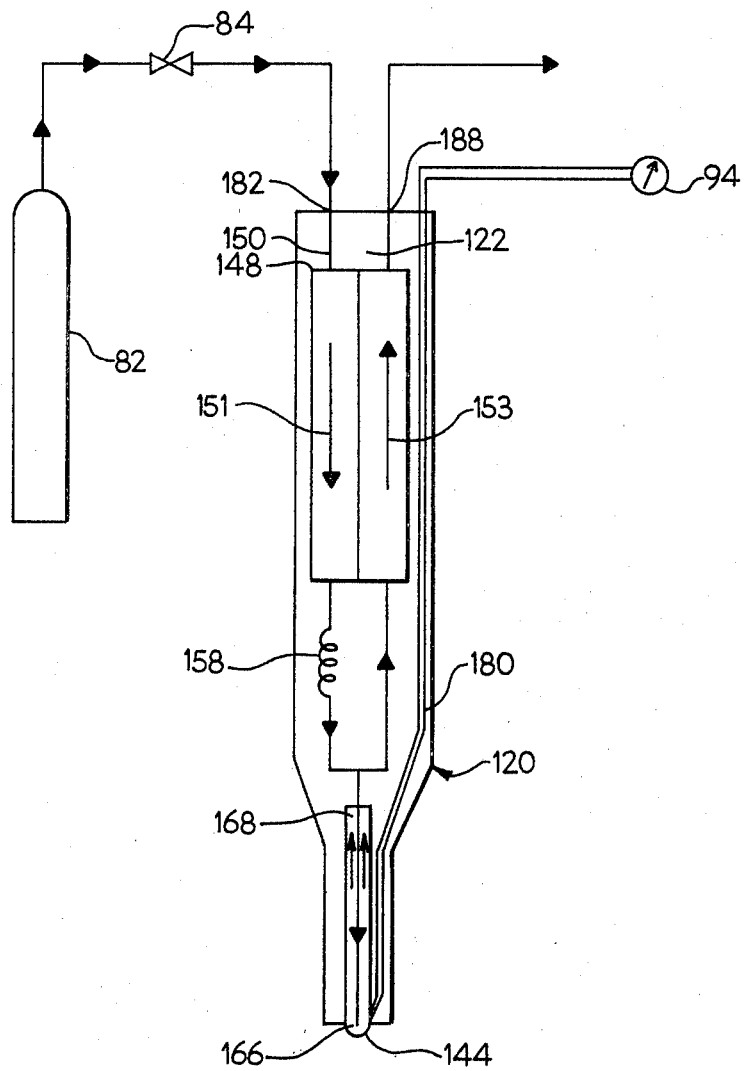
FIG. 18 is a diagrammatic view of the embodiments of the invention shown in FIGS. 5–13.

Inlet 24 is connected to a gaseous cryogenic refrigerant supply means 82, FIG. 4, through supply conduit 32. Outlet 26 of the warmer path of heat exchanger 22 communicates with a cold collecting chamber 34, FIG. 1, through an expansion cooling portion in the form of a capillary constriction tube 36 in which cooling takes place due to an isenthalpic expansion of the gaseous refrigerant as it passes through tube 36.

Cold collecting chamber 34 delivers the expanded and cooled gas to the colder path of the heat exchanger through inlet 28. Outlet 30 of the colder path communicates with the atmosphere through exhaust port 38.

Figure 2:
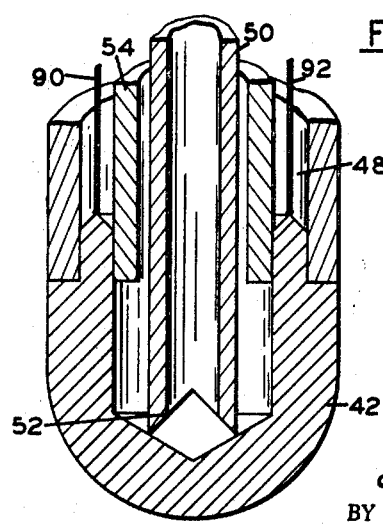
FIG. 2 is an enlarged partial side sectional view of a cold tip portion of the apparatus of FIG. 1, the section being taken along line 2—2 of FIG. 1.

A surgical probe means, indicated generally at 40, includes an uninsulated cold tip portion 42 best seen in FIG. 2. The upper portion 44 of probe means 40 is mounted within the lower portion of housing means 20 at 46.

Probe means 40, with the exception of cold tip portion 42, is entirely surrounded by a vacuum insulating jacket 48.

Referring to FIGS. 1 and 2, the cold tip portion 42 of probe means 40 communicates with cold expansion chamber 34 through a by-pass conduit 50 having a V-cut end 52. A concentric outlet conduit 54, surrounding a portion of by-pass conduit 50, leads from cold tip portion 42 to an exhaust chamber 56.

An exhaust conduit 58 connects exhaust chamber 56 to an exhaust port 60 controlled by a by-pass valve, indicated generally at 62.

Figure 3:
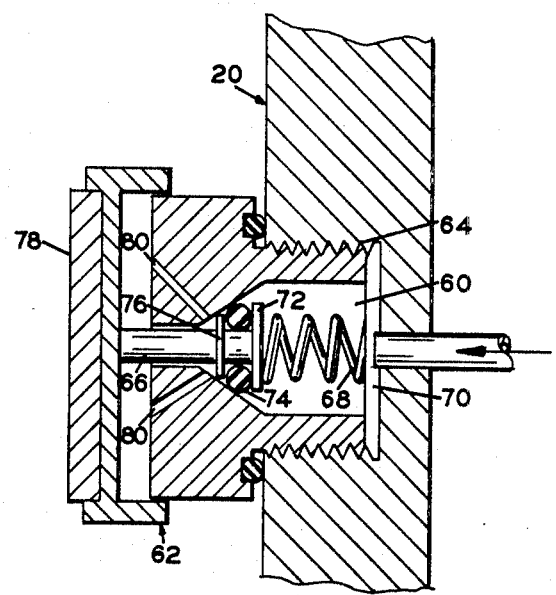
FIG. 3 is a partial side sectional view of a by-pass valve comprising a portion of the apparatus of FIG. 1, the section being taken along the line 3—3 of FIG. 1.

As best illustrated in FIG. 3, a flow control or by-pass valve means 62 is mounted in exhaust port 60 in the wall of housing means 20 at threaded junction 64.

A movable valve element 66 is biased outwardly by a compression spring 68 disposed between the casing and an inner end 72 of valve element 66 and sealed by an O-ring 74 mounted between inner end 70 and a shoulder 76. It can be readily seen from FIG. 3 that inward pressure on valve actuator 78 opens exhaust port 60 to atmosphere through ports 80.

It is important to point out that various types of conventional valve structures may be used for by-pass valve 62 without departing from the spirit of the invention.

Referring to FIG. 4, the flow cycle of refrigerant through the cryosurgical apparatus of the present invention is diagrammatically illustrated.

A pressure cylinder 82 containing a gaseous cryogenic refrigerant, such as nitrogen, at ambient temperature and under high pressure is connected to heat exchanger 22 via inlet conduit 32 and a flow control valve means 84 is provided to regulate the flow of refrigerant. Refrigerant enters inlet 24 of the heat exchanger and flows through warmer path 86 to outlet 26. Then the refrigerant enters capillary constriction tube 36 which communicates with cold collecting chamber 34. As refrigerant enters the capillary constriction tube 36 it is understood that the refrigerant is cooled by isenthalpic expansion. The cooled gaseous nitrogen then leaves chamber 34 via inlet 38 of the colder path 88 of the heat exchanger in heat exchange relationship with the incoming refrigerant in the warmer path 86 and leaves the housing means via outlet 30 and exhaust port 38.

When by-pass valve 62 is opened, a portion of the flow of gaseous nitrogen is released from cold collecting chamber 34 through by-pass conduit 50 to the tip portion 42 and out through concentric outer conduit 54 to exhaust chamber 56. From exhaust chamber 56, the diverted portion of the gaseous nitrogen is released via exhaust conduit 58, exhaust port 50, and by-pass valve 62 to atmosphere.

In operation, the surgeon or an assistant opens valve means 84 and after approximately five minutes of precooling has elapsed, the refrigerant establishes an equilibrium at, for example, the typical temperature indicated in FIG. 4.

The surgeon then places the tip portion 42 on the tissue to be frozen while holding the handle portion 20 in such a manner that the valve 62 may be opened with ease to permit cold refrigerant to flow into tip portion 42. Approximately 10 to 30 seconds are required before tip portion 42 reaches the desired temperature of approximately 101 degrees below zero centigrade as indicated in FIG. 4.

After the surgeon has performed localized freezing of the tissue area, he releases valve 62 thereby preventing circulation of refrigerant through tip portion 42.

If the surgery happens to be on critical parts of the body, such as the brain or eye, the surgeon must wait until the temperature of the cold tip portion has risen to a safe level in order to prevent accidental injury to other tissue surrounding the frozen tissue. Therefore a thermocouple is disposed in the tip portion 42 with wires 90 and 92 leading from tip portion 42 to a gauge 94. The surgeon then may at all times be aware of the temperature of cold tip portion 42.

It is important to point out that the vacuum air space 48 surrounding the probe means 40 prevents the entire outer portion of the probe means except the tip portion from becoming cold. This concentrates the cooling effect of the refrigerant in the tip portion 42 and further prevents accidental damage to tissue in the general area of surgery which may come in contact with the length of probe means 40 above cold tip 42.

Referring now to the embodiment of FIGS. 5 through 13, a housing means indicated generally at 120 includes a chamber 122 surrounded by a vacuum air space 124 and a removable top closure indicated generally at 134, which fits into an opening 128 to chamber 122. An annular spacer 130 is attached to the outer upper portion of chamber 122 to seal air space 124 from the atmosphere.

Air space 124 is evacuated through a tube 132 extended through and tightly sealed to a bore in spacer 130. After air space 124 is evacuated tube 132 is sealed at the upper end to preserve the vacuum.

As best seen in FIG. 6, top closure 134 is removably mounted in opening 128, being retained by a plurality of spaced set screws 126, and includes threaded portion 138. Top closure 134 is provided with a bore 140, an inlet port 182, and a plug connection 184 which will be described in detail later herein.

A protective sleeve 136 is slideably advanced over the bottom of housing means 20 to threadably engage threaded portion 138 of top closure 134. Sleeve 136 includes a plurality of outlet ports 188 which communicates with bore 140.

Now referring to FIGS. 6 and 7, housing means 120 further includes a probe portion 142 which is insulated by a continuation of vacuum air space 124 along its entire length except for cold tip portion 144 which will be described in detail later herein.

Referring now to FIGS. 6, 8, and 9, a miniature cryogenic cooling apparatus indicated generally at 146, is removably mounted in chamber 122 through opening 128.

Cooling apparatus 146 includes a heat exchanger 148 and an expansion cooling means in the form of a capillary constriction tube 158.

Heat exchanger 148 includes a core 154 and a length of tubing 150, a portion of which is spirally wound about core 154. Tubing 150 is provided with a spirally wound fin 149 of rectangular configuration to increase the heat exchange area.

An upper portion of tube 150 is connected in vacuum tight relationship to port 182. A warmer path 151 of heat exchanger 148 is thus formed as refrigerant flows into port 182 and through tubing 150.

The lower end of tubing 150 is connected to capillary constriction tube 158. As gaseous refrigerant enters tube 158, cooling occurs due to isenthalpic expansion of the gas. The upper portion of constriction tube 158 is spirally wound about the lower portion of core 154 and then extends downwardly through one of a plurality of ports 171 into a bore 170, ports 171 and bore 170 being formed in core 154.

Tube 158 continues through bore 170 and an opening 160 in the lower portion of chamber 122, and extends the entire length of probe means 142 to terminate in a bore 166 formed in cold tip portion 144, FIG. 10.

Opening 160 is formed in a guide ferrule 162, preferably consisting of an insulating material and an inner flange 164. Inner flange 164 is fastened in vacuum tight relationship to inner walls 156.

Now referring to FIGS. 6 and 10, an outlet conduit 168 surrounds the lower portion of tube 158 in a concentric manner and communicates with bore 166 and bore 170. The uppermost portion of outlet conduit 168 is attached to flange 164 in vacuum tight relationship as is the lowermost portion so attached to cold tip 144 which will be described later herein.

Bore 170, FIG. 9, communicates with a colder path 153 of heat exchanger 148 through ports 171, colder path 153 being formed as the cooled refrigerant passes around tubing 150 and fin 149 in between inner walls 156. A packing 155 aids the formation of a more definite flow path for colder path 153.

As best seen in FIGS. 10 through 13, cold tip portion 144 includes an annular rib 172, a base portion 174, and countersunk bore 166.

The lower end of outlet conduit 168 is connected in vacuum tight relationship to the inside of rib 172 and rests on shoulder 176. The outer shell of probe means 142 is similarly connected to the outside of rib 172 and rests on shoulder 178. The upper end of conduit 168 is connected to flange 164 and communicates with bore 170 through opening 160 as previously described.

As best seen in FIG. 10, a thermocouple is provided to measure the temperature of cold tip 144 and includes lead wires 180 provided with an insulating cover and are operatively connected to rib 172. Wires 180 are helically wound around outlet conduit 168 to also function as a spacer for that portion of vacuum air space 124 in probe means 142. Wires 180 extend the entire length of air space 124 and lead through an orifice provided in spacer 130 into top closure 134, there being connected to plug connection 184. Wires 180 are sealed in the orifice to preserve the vacuum in air space 124. Plug connection 184 is provided for a convenient method to operatively connect the lead of a measuring meter to thermocouple wires 180.

Referring specifically to FIGS. 10, 12, and 13, two modifications with respect to the shape of cold tip portion 144 are illustrated. FIG. 12 illustrates a cold tip having a base 174 provided with a flat but slanted bottom surface. FIG. 13 illustrates a base 174–b provided with a spherical bottom surface. It is important to point out that the shape and size of cold tip portion 144 may vary according to the particular requirements of the surgical application for which the apparatus is to be used. This use may be, for example, mainly for very delicate brain or eye surgery, or for relatively less delicate outer skin surgery to remove blemishes and the like. The shape and size of the cold tip will be designed accordingly. The upper portion of both embodiments are identical and are attached to probe means 142 in the manner previously described.

Now referring specifically to FIG. 11, a modified form of cold tip portion 144 is illustrated which is connected to probe means 142 in the same manner as previously described. However, the base portion 174–a is provided with a threaded portion 175 on which an extension 177, indicated by broken lines, may be removably mounted. The extension may take various shapes, for example, spherical, blunt, or knife edged or may include an offset or arcuate portion. The shape and size would depend upon the particular requirement of the surgical application. It is important to point out that with the modified form of cold tip portion 144 illustrated in FIG. 13 only one cryosurgical apparatus is necessary for a variety of surgical applications thereby reducing the expense involved when a variety of surgical applications are expected to be encountered.

It is important to point out that the extension should not be of greater length preferably one-half to one inch, to assure maximum cooling although this may be extended for certain surgical requirements where a higher operating temperature is sufficient.

In operation, a gaseous supply of cryogenic refrigerant nitrogen, for example, not being shown, is operatively connected to a port 182 in top closure 134. Port 182 is connected to inlet conduit 150. A measuring meter, not shown, is operatively connected to plug connector 184 also provided in top closure 134.

The surgeon or an assistant then opens the valve to the supply means permitting the gaseous refrigerant to flow through tubing 150 which forms warmer path 151 of heat exchanger 148. The refrigerant next enters capillary constriction tube 158 where it will be understood that cooling takes place by means of isenthalpic expansion of the gaseous refrigerant. The flow continues through tube 158 to outlet in bore 166 of cold tip portion 144. The refrigerant then enters outlet conduit 168 which outlets in bore 170 which in turn communicates with colder path 153 through ports 171. The flow through colder path 153 is in heat exchange relationship with the incoming flow of refrigerant in warmer path 151. Colder path 153 outlets to atmosphere through bore 140 and ports 188 in top closure 134 and sleeve 136 respectively.

It is important to point out that cold tip 144 rapidly reaches a typical temperature of, for example, approximately 100 degrees below zero centigrade after circulation of the refrigerant has continued for approximately five to eight minutes.

When a temperature of less than 100 degrees below zero centigrade is sufficient to begin the surgery, it is understood that the time of circulation of the refrigerant may be decreased.

It is also important to point out that the circulation time necessary to reach 100 degree below zero centigrade operating temperature may be, in effect, shortened to approximately 10 to 30 seconds to permit use in certain surgical applications where the probe must be warm enough not to destroy good tissue which may be touched as it is being inserted into the operating area. This shortened period is achieved by permitting circulation of refrigerant for five to eight minutes in which the temperature of approximately 100 degrees below zero centigrade is reached. Then the gas supply is shut-off and cold tip 144 is allowed to warm only to a temperature wherein it may safely contact tissue without damage to the tissue. As soon as the safe temperature is reached cold tip 144 is then placed upon the area which is to be frozen and the gas supply is turned on to again start the cooling process. Using this procedure, operating temperatures approaching −100° centigrade are reached in approximately ten to thirty seconds.

When the surgery is complete, the supply of refrigerant is merely shut-off and in a very short time cold tip portion 144 sufficiently warms so it may be withdrawn from the tissue being operated on without danger of unintended damage to surrounding tissue.

It is important to point out that miniature heat exchanger 148 provides very efficient cooling. Core 154 is formed, preferably, of a material of very low conductivity, such as Teflon, for example, and is shaped to include integral ribs 157, which with packing 155 aids the formation of a more definite passage for colder path 153 to better assure an efficient heat exchange relationship between the refrigerant in the warmer and colder paths.

It is also important to point out that top closure 134 and miniature cryogenic cooling apparatus 146 may easily be removed from housing means 120 by unscrewing and removing sleeve 136 and then set screws 126. Closure 134 and cooling apparatus 146 may then be withdrawn as a unit from housing means 120.

Reference is now made to FIGS. 14 through 17 wherein another modified embodiment of the present invention is illustrated which includes means for rapidly heating cold tip 190. Those portions of this embodiment which are identical to the embodiment described in FIGS. 5–13 are indicated by the same reference numerals.

By providing means to heat the cold tip, it may be removed from the tissue which was frozen in the operation much sooner thereby reducing the total operating time by as much as five minutes.

As best seen in FIGS. 16 and 17, a modified cold tip is indicated generally at 190 and includes an annular rib 192 which is much longer than rib 172 shown in the previous embodiments of the present invention. The uppermost portion of rib 192 is provided with a shoulder 194 to which outlet conduit 168 is attached in the same manner as previously described.

As best seen in FIG. 17, the insulated thermocouple wires 180, which are preferably a constantan-copper thermocouple, extend in parallel relationship with an insulated heater lead 196 which is formed in a loop 198. While in parallel relationship wires 196 and 180 are wound around rib 192 starting near the bottom and continue to be wound around substantially the entire length of said rib. The insulation is removed from thermocouple wires 180, preferably copper and constantan, at the lowermost end and these bare ends 193 are soldered to a shoulder 200 provided on tip 190 to operatively connect thermocouple wires 180 to cold tip 190.

Wires 180 and 196 continue to extend upward from cold tip 190 and are next helically wound about outlet conduit 168 to also serve as a spacer to position conduit 168 within probe means 142.

Wires 196 and 180 then extend upwardly through vacuum air space 124 and spacer 130 in the same manner as thermocouple wires 180 in the previously described embodiments.

From spacer 130, wires 180 and 196 extend into top closure 134 there being operatively connected to a plug connection 184–A which includes four outlets, not shown. Plug connection 184 provides a convenient method to operatively connect the lead of a measuring meter to thermocouple wires 180 and the heater lead 196 to a voltage source not shown.

In operation, the modified cryosurgical apparatus is used in the same manner as the embodiment illustrated in FIGS. 5–13, the only difference in operation relating to the use of the heating means after surgery is complete to enable the surgeon to remove the cold tip from the tissue sooner without the danger of damaging said tissue.

In its simplest form, a voltage source which is connected to heater lead 196 at plug connection 184–A may be turned on to send electric current through heater lead 196 to heat the coil portion of heater lead 196 formed about rib 192 and transfer the heat generated to cold tip 190 to cause a very rapid thaw of the frozen tissue from the cold tip.

It is important to point out that the heating means for the cold tip is particularly important in surgical applications involving the eye or surface lesions, for example, wherein a relatively long time must elapse before the cold tip of the probe will warm sufficiently to permit the tip to be removed from the frozen tissue without damage. This long thaw period is present any time there is a lack of a mass of warm tissue surrounding the cold tip. The thaw period in these particular surgical applications is reduced by as much as five minutes by the use of the heating coil described herein. But in all cryosurgical applications reduction of the "thaw period" is highly desirable and most convenient.

It is also important to point out that other means for heating the cold tip may be used without departing from the spirit of the present invention.

Further, it is pointed out that various automatic controls may be adapted for use with the present invention, for example, using a solenoid valve to automatically operate the heater and the refrigerant flow control valve to control the temperature of the cold tip within a predetermined range.

While the forms of embodiments of the present invention as herein disclosed constitute preferred forms, it is to be understood that other forms might be adopted, all coming within the scope of the claims which follow.

We claim:
1. A cryosurgical apparatus comprising, in combination, gaseous cryogenic refrigerant supply means at room temperature; housing means including a probe portion and uninsulated cold tip; a miniature cryogenic heat exchanger means including a warmer path extending longitudinally within said housing means for delivering a flow of refrigerant in one direction, and a colder path extending in heat exchange relationship with said warmer path whereby the temperature of said flow in said warmer path is progressively cooled by the counter flow during cool-down of said cold tip to $-100°$ C.; and expansion cooling means isenthalpically reducing the refrigerant pressure including an inlet communicating with said warmer path and an outlet for delivering refrigerant to said cold tip.

2. The apparatus defined in claim 1 that includes a valve means for controlling the flow of refrigerant to said warmer path of said heat exchanger means.

3. The apparatus defined in claim 1 that includes a valve means for controlling the flow of refrigerant from said heat exchanger means through said cold tip.

4. The apparatus defined in claim 1 wherein said warmer and colder paths are formed by conduits of spiral configuration.

5. The apparatus defined in claim 1 wherein said expansion cooling means comprises a capillary constriction tube.

6. A cryosurgical apparatus comprising a housing including a probe tip extending therefrom, heat exchanger means in said housing including a warmer path for connection to a supply source of gaseous cryogenic refrigerant under pressure at room temperature for delivering the refrigerant in one direction to said probe tip and a colder path in countercurrent heat exchange disposition with said warmer path for carrying refrigerant away from said tip, and flow constricting means intermediate said warmer path and said colder path isenthalpically reducing the pressure of the refrigerant during transfer thereof from the warmer path to the colder path so that the temperature of the flow through said warmer path is progressively cooled by the counterflow in said colder path and cryogenic probe tip temperatures are achieved with the ambient temperature refrigerant supply source.

7. The cryogenic apparatus of claim 6 wherein said flow constricting means comprises an expansion orifice.

8. The cryogenic apparatus of claim 6 wherein said flow constricting means comprises a capillary constriction tube connected to said warmer path and having an end terminating within a cold collecting chamber.

9. The cryogenic apparatus of claim 8 wherein said probe tip is hollow and terminates in an uninsulated closed end, the interior of said probe tip communicating with said cold collecting chamber.

10. The cryogenic apparatus of claim 9 including valve means for circulating the flow of refrigerant from said cold collecting chamber through said hollow probe tip.

11. The cryogenic apparatus of claim 10 wherein said hollow probe tip includes an inner concentric tube communicating with said cold collecting chamber, and said valve means being interposed in a conduit extending from the annular space about said inner concentric tube to atmosphere.

12. The cryogenic apparatus of claim 6 including means for rapidly heating said probe tip.

13. The cryogenic apparatus of claim 6 wherein said heat exchanger means comprises warmer and colder paths of spiral configuration.

14. The cryogenic apparatus of claim 13 wherein said warmer and colder paths are alternately-arranged coils.

15. The cryogenic apparatus of claim 6 including means for measuring the temperature of said probe tip.

16. The cryogenic apparatus of claim 6 wherein the probe tip has a rounded end.

17. The cryogenic apparatus of claim 6 wherein the probe tip has a knife-edge end.

18. The cryogenic apparatus of claim 6 wherein the probe tip has an obliquely formed end.

References Cited

UNITED STATES PATENTS

| | | | |
|---|---|---|---|
| 1,503,528 | 8/1924 | Fabret | 128—400 |
| 2,645,097 | 7/1953 | Posch | 128—303 |
| 3,220,414 | 11/1965 | Johnston | 128—400 |
| 3,228,400 | 1/1966 | Armao | 128—303.1 |
| 3,272,203 | 9/1966 | Chato. | |

OTHER REFERENCES

Cryogenic Surgery of the Basal Ganglia, by Irving S. Cooper, in the Journal of the American Medical Association, Aug. 18, 1962 (pp. 600–605 relied on).

LOUIS G. MANCENE, Primary Examiner

G. E. McNEILL, Assistant Examiner